US012135682B1

(12) United States Patent
Scotney

(10) Patent No.: US 12,135,682 B1
(45) Date of Patent: Nov. 5, 2024

(54) ARCHIVAL SYSTEM AND SERVICE FOR USE WITH THIRD-PARTY NETWORK SERVICES

(71) Applicant: StratoKey Pty Ltd., Hobart (AU)

(72) Inventor: Anthony Scotney, Hobart (AU)

(73) Assignee: StratoKey Pty Ltd., Hobart (AU)

( * ) Notice: Subject to any disclaimer, the term of this patent is extended or adjusted under 35 U.S.C. 154(b) by 655 days.

(21) Appl. No.: 16/131,490

(22) Filed: Sep. 14, 2018

(51) Int. Cl.
G06F 16/11 (2019.01)
G06F 16/21 (2019.01)
G06F 21/60 (2013.01)
H04L 9/08 (2006.01)
H04L 67/53 (2022.01)
H04L 67/5683 (2022.01)

(52) U.S. Cl.
CPC .......... *G06F 16/113* (2019.01); *G06F 16/212* (2019.01); *G06F 21/602* (2013.01); *H04L 9/0819* (2013.01); *H04L 67/53* (2022.05); *H04L 67/5683* (2022.05)

(58) Field of Classification Search
CPC .... G06F 16/113; G06F 21/602; H04L 9/0819; H04L 67/20; H04L 67/2857
USPC ......................................................... 713/167
See application file for complete search history.

(56) References Cited

U.S. PATENT DOCUMENTS

| 6,829,638 | B1 | 12/2004 | McBrearty | |
|---|---|---|---|---|
| 7,788,407 | B1 | 8/2010 | Venkat | |
| 8,437,744 | B1 * | 5/2013 | Heins | H04L 51/58 455/418 |
| 8,566,247 | B1 * | 10/2013 | Nagel | H04L 63/045 380/270 |
| 8,768,307 | B1 * | 7/2014 | Heins | H04M 3/42382 455/3.06 |
| 9,076,004 | B1 * | 7/2015 | Bogorad | G06F 21/602 |
| 9,197,673 | B1 | 11/2015 | Gaddy | |
| 9,794,061 | B1 * | 10/2017 | Bushman | H04L 9/0631 |
| 9,910,745 | B1 * | 3/2018 | Lukkoor | G06F 11/1469 |
| 9,953,309 | B2 * | 4/2018 | Carlson | G06Q 20/363 |
| 10,360,243 | B2 | 7/2019 | Ukai | |

(Continued)

FOREIGN PATENT DOCUMENTS

CN 101398871 A 4/2009

OTHER PUBLICATIONS

"Flashproxy: Transparently Enabling Rich Web Content via Remote Execution", Jun. 17-20, 2008, MobiSys'08, Breckenridge, Colorado, USA, retrieved from http://citeseerx.ist.psu.edu/viewdoc/download;jsessionid=159110DAEE75CBDD05764EBEC094321D?doi=10.1.1.143.6717&rep=rep1&type=pdf on Mar. 11, 2021. (Year: 2008) 13 Pages.

(Continued)

*Primary Examiner* — Dereena T Cattungal
(74) *Attorney, Agent, or Firm* — Mahamedi IP Law LLP

(57) ABSTRACT

A network computer system to process communications that include at least one of (i) requests sent from a set of client terminals to a third-party network service, or (ii) response communications, sent from the third-party network service to the set of client terminals. The network computer system implements operations to select data sets from the processed communications for archival. The network computer system can store the data sets in association with the determined contextual information in an archival data structure, independent of the third-party network service.

19 Claims, 3 Drawing Sheets

(56) References Cited

U.S. PATENT DOCUMENTS

| | | |
|---|---|---|
| 10,372,926 B1 | 8/2019 | Leshinsky |
| 10,447,710 B1 | 10/2019 | Li |
| 10,594,721 B1 | 3/2020 | Scotney |
| 10,798,064 B1 | 10/2020 | Scotney |
| 10,826,946 B2 | 11/2020 | Bykampadi |
| 10,880,322 B1 | 12/2020 | Jakobsson |
| 10,936,751 B1* | 3/2021 | Scotney ............... G06F 16/258 |
| 10,963,590 B1 | 3/2021 | Dash |
| 11,042,506 B2 | 6/2021 | Aksionkin |
| 11,089,126 B1 | 8/2021 | Scotney |
| 11,416,874 B1 | 8/2022 | Scotney |
| 11,503,067 B2 | 11/2022 | Kras |
| 11,783,349 B2 | 10/2023 | Scotney |
| 2002/0128925 A1 | 9/2002 | Angeles |
| 2003/0079120 A1 | 4/2003 | Hearn |
| 2004/0024826 A1 | 2/2004 | Halahmi |
| 2005/0132286 A1* | 6/2005 | Rohrabaugh ......... G06F 40/134 715/239 |
| 2006/0004719 A1 | 1/2006 | Lawrence |
| 2006/0149590 A1 | 7/2006 | Palmer |
| 2006/0253594 A1 | 11/2006 | Szabo |
| 2007/0300057 A1 | 12/2007 | Corcoran |
| 2008/0301805 A1 | 12/2008 | Bharara |
| 2009/0063952 A1 | 3/2009 | Raghavachari |
| 2009/0217354 A1 | 8/2009 | Blum |
| 2010/0071052 A1 | 3/2010 | Mao |
| 2010/0088389 A1* | 4/2010 | Buller ............... G06F 11/1464 709/216 |
| 2010/0198917 A1 | 8/2010 | Petersen |
| 2012/0030294 A1 | 2/2012 | Piermot |
| 2012/0117458 A1 | 5/2012 | Holloway |
| 2012/0143968 A1* | 6/2012 | Oren .................... H04L 61/106 709/206 |
| 2012/0179787 A1 | 7/2012 | Walsh |
| 2012/0324113 A1 | 12/2012 | Prince |
| 2013/0346453 A1* | 12/2013 | Procopio ............. G06F 16/1794 707/809 |
| 2014/0006357 A1* | 1/2014 | Davis .................... G06F 16/182 707/667 |
| 2014/0046906 A1* | 2/2014 | Patiejunas ........... G06F 21/6209 707/661 |
| 2014/0095865 A1 | 4/2014 | Yerra |
| 2014/0122866 A1 | 5/2014 | Haeger |
| 2014/0129457 A1 | 5/2014 | Peeler |
| 2014/0229729 A1 | 8/2014 | Roth |
| 2014/0282936 A1* | 9/2014 | Fitzgerald ........... H04L 41/0806 709/221 |
| 2014/0337614 A1 | 11/2014 | Kelson |
| 2015/0006890 A1 | 1/2015 | Roth |
| 2015/0039887 A1* | 2/2015 | Kahol ................ H04L 63/0471 713/165 |
| 2015/0067881 A1 | 3/2015 | Badstieber |
| 2015/0249684 A1 | 9/2015 | Zhang |
| 2015/0278545 A1 | 10/2015 | Bigras |
| 2016/0004729 A1 | 1/2016 | Evans |
| 2016/0019224 A1* | 1/2016 | Ahn ...................... G06F 16/113 707/671 |
| 2016/0087933 A1 | 3/2016 | Johnson |
| 2016/0171227 A1 | 6/2016 | Margolin |
| 2016/0217269 A1 | 7/2016 | Goettges |
| 2016/0226844 A1 | 8/2016 | Pecka |
| 2016/0234330 A1 | 8/2016 | Popowitz |
| 2016/0261668 A1 | 9/2016 | Joel |
| 2016/0269371 A1 | 9/2016 | Coimbatore |
| 2017/0034100 A1 | 2/2017 | Zink |
| 2017/0201526 A1 | 7/2017 | Yehuda |
| 2017/0223003 A1 | 8/2017 | Miles |
| 2017/0236129 A1 | 8/2017 | Kholkar |
| 2017/0243028 A1 | 8/2017 | LaFever |
| 2017/0286437 A1* | 10/2017 | Stevens ................ G06F 16/137 |
| 2018/0025011 A1 | 1/2018 | Aksionkin |
| 2018/0063117 A1 | 3/2018 | Tseng |
| 2019/0236283 A1* | 8/2019 | Koster ................ G06F 16/1744 |
| 2019/0286850 A1 | 9/2019 | Popescu |
| 2020/0065523 A1 | 2/2020 | Fukuda |
| 2020/0073940 A1 | 3/2020 | Grosset |
| 2020/0175484 A1 | 6/2020 | Kumar |
| 2020/0213345 A1 | 7/2020 | Scotney |
| 2020/0236187 A1 | 7/2020 | Tal |
| 2021/0021573 A1* | 1/2021 | Scotney ............... H04L 63/0281 |
| 2021/0344770 A1 | 11/2021 | Scotney |
| 2022/0019695 A1 | 1/2022 | Scotney |

OTHER PUBLICATIONS

"Linh et al. Compliance monitoring in business processes: Functionalities, application and tool-support. Information Systems. vol. 54. Dec. 2015. 3 Pages. https://www.sciencedirect.com/science/article/pii/S0306437915000459 (Year: 2015)".

* cited by examiner

ARCHIVAL SYSTEM AND SERVICE FOR USE WITH THIRD-PARTY NETWORK SERVICES

FIELD OF THE INVENTION

Examples relate to an archival system and service for use with third-party network services.

BACKGROUND

Cloud, SaaS and web services are increasingly used to store mission critical data. Using hosted services can expose security issues due to the fact that these services typically store information (often confidential) outside the corporate firewall. Increasingly, organizations are becoming completely reliant on the SaaS, cloud or hosting vendor's data backup and disaster recovery processes.

DETAILED DESCRIPTION

Figure 1:
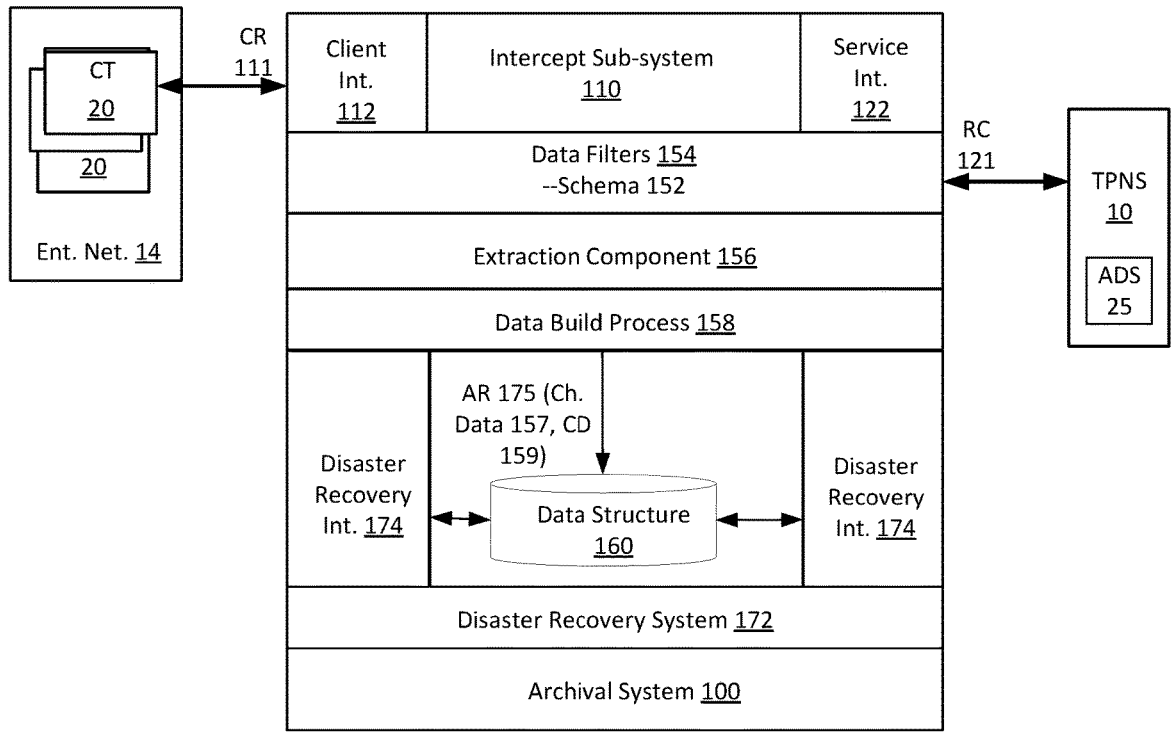
FIG. 1 illustrates a network computer system to selectively archive data that is exchanged between client computers and a third-party network service.

Examples provide for a computer system that implements an archival service for client terminals that utilize a third-party network service.

Still further, in other examples, a network computer system can implement an archival service as part of, or in connection with an intercept or proxy service that facilitates, or otherwise enables client terminals to access a third-party network service. In examples, the network computer system processes communications that include at least one of (i) requests sent from a set of client terminals to a third-party network service, or (ii) response communications, sent from the third-party network service to the set of client terminals. The network computer system implements operations to (i) select data sets from the processed communications for archival. The network computer system can store the data sets in an archival data structure, independent of the third-party network service.

In examples, an archival system is implemented by a network computer system that archives select data of an organization prior to such data being stored with a third-party network service. In examples, the archival data system can be implemented separate from the third-party network service, where the original data may reside.

In some examples, the archival system is implemented as part of an intercept computer system. The intercept computer system can integrate, or otherwise implement an archival service in connection with providing an intercept or proxy service. In examples, the intercept computer system can provide an on-demand archival service.

In variations, an archive system can include an on-demand interface that can be accessed, or otherwise operated by a third-party network service, in connection with servicing requests from client terminals of enterprise accounts. In other variations, an archive system can also provide an archive service for end-users, where the archival service archives data from an interoperable external service such a cloud encryption gateway, external proxy server or other service.

Examples recognize that hosted computer systems can be susceptible to corruption and/or other events that cause significant data loss. Conventional data backup tools operate on an after-the-fact (post storage) model, and typically operate to resurrect data back into the SaaS, cloud or hosted system. However, such conventional approaches do not allow for an end user or entity to immediately access critical data in the event the third-party network service is completely unavailable. By way of example, in the event of catastrophic failure, a third-party network service can be offline for a significant amount of time, which could potentially make the disaster recovery process ineffective.

One or more examples described herein provide that methods, techniques, and actions performed by a computing device are performed programmatically, or as a computer-implemented method.

Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, servers, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Archival System

FIG. 1 illustrates a network computer system to selectively archive data that is exchanged between client computers and a third-party network service. In examples, an archival system 100 can be implemented using a network computer system, such as a server, or combination of servers. As described by various examples, the archival system 100 can archive communications exchanged between the client terminals 20 and the TPNS 10. In examples, the archival system 100 can selectively archive data sets in communications that the system receives and forwards as between a group of client terminals 20 (e.g., operating as part of the enterprise network 14) and a third-party network service ("TPNS" 10). In such examples, the archival system 100 can be implemented to be in-line with respect to client terminals 20 and the TPNS 10. For example, the archival system 100 can be implemented with or as part of a proxy service that intercepts client requests 111 that are intended for the TPNS 10, as well as response communications 121 that are received from the TPNS 10 and intended for respective client terminals 20.

In variations, the archival system 100 can be implemented as a web service that is integrated with the TPNS 10. For example, the TPNS 10 can implement the archival system 100 as an additional layer of functionality, to selectively archive data sets from individual accounts (e.g., an enterprise account for the client terminals 20). In such variations, the TPNS 10 can trigger or control implementation of the archival system 100. Still further, in other variations, the TPNS 10 can be implemented as a separate service for an account user (e.g., enterprise administrator, end user, etc.). For example, the archival system 100 can be implemented as an independent network service which the client terminals 20 can utilize when accessing the TPNS 10.

With respect to examples as described, each of the client terminals 20 may correspond to, for example, an end user terminal, work station or other computer system capable of communicating with the archival system 100 over the World Wide Web and/or other data networks. The TPNS 10 may correspond to, for example, a cloud service, such as a SaaS or cloud service. The TPNS 10 can structure a data collection or library for an individual enterprise account and/or user. In examples, an account data collection can be structured into tables, rows and columns, where the tables, rows and/or columns identify respective fields and corresponding values which are specific to the user account. In additional examples, the data collection of a given account can be associated with an account-specific schema 152. The account specific schema 152 can identify the structure of a given account's data collection, as well as fields, users and/or other characteristics of data fields which are to have priority, at least for archival purposes.

Among other advantages, archival system 100 can selectively archive various types of data in a manner that is transparent and seamless to the end user's (via the client terminal 20) utilization of the TPNS 10. In examples, the archival system 100 can archive select data sets, such as mission critical data, with corresponding contextual information to enable retrieval and use of such data in the event disaster recovery of the respective account data is ever needed from the TPNS 10. In examples, the mission critical data can represent a type, category or specific data set, which an organization (e.g., enterprise) is likely to require in a given duration, for a given purpose (e.g., perform daily operations, comply with audits, etc.).

According to some examples, the archival system 100 can be integrated, or otherwise provided with one or more intermediate or intercept sub-systems 110. While an example of FIG. 1 illustrates the intercept sub-system 110 as being integrated with the archival system 100, in variations, the intercept sub-system 110 can be implemented as an independent computer system that utilizes the archival system 100. For example, the archival system 100 and the intercept sub-system 110 can be operated by separate and independent entities.

In examples, the intercept sub-system 110 processes communications exchanged between individual client terminals 20 and the TPNS 10, in order to provide a separate network service for the client terminals 20 and/or the TPNS 10. Accordingly, the intercept sub-system 110 can process client requests 111 which individual client terminals 20 communicate to the TPNS 10, as well as response communications 121 which the TPNS 10 returns to the requesting client terminals 20.

In examples, the TPNS 10 may retain structured data sets for individual accounts, where each account is used to retain data for a corresponding user entity (e.g., enterprise user entity, end user entity). Client terminals 20 can exchange transactions with the TPNS 10 via the archival system 100, where the intercept sub-system 110 can implement a service that enables the client terminals to, for example, update, modify, delete or create data sets of the respective account. In some examples, the TPNS 10 can store tables or forms for a user entity, and one or more client terminals 20 of the user entity can submit client requests 111 to the TPNS 10 to access the tables or forms, where the client requests 111 perform operations such as updating respective values of one or more fields for individual tables or forms. In such examples, the TPNS 10 can store one or more data structures (e.g., table to create form) that are configured by the account holder (e.g., enterprise holder) to define, for example, fields and respective relationships amongst the fields, as well as data sets that represent specific data sets that represent values of specific fields for individual tables or forms.

The archival system 100 can include a client interface 112 and a service interface 122. In some examples, the intercept sub-system 110 can provide one or more auxiliary services that provide additional functional services for client terminals 20 that utilize the TPNS 10. The intercept sub-system 110 can process transactions between the client terminals 20 and the TPNS 10, where individual transactions include client requests 111 and TPNS response communications 121. The client interface 112 can receive client requests 111 from individual client terminals 20, where the client requests 111 can be in the form of read or write type requests. Likewise, the service interface 122 can receive service response communications 121 from the TPNS 10, where the TPNS response communications 121 are intended for respective client terminals 20. In examples, the TPNS response communications 121 can correspond to responses to respective client requests 111 from individual client terminals 20.

The archival system 100 operates to selectively extract, replicate and store data contained in the transactions which the archival system 100 processes between individual client terminals 20 and the TPNS 10. The archival system 100 can be configured with extraction schema 152 to automatically and selectively target data sets from the transaction data which the archival system 100 handles (e.g., client requests 111 and TPNS response communications 121). The archival system 100 can, for example, interface with a network access manager of the enterprise network 14 and/or of the TPNS 10, to identify characteristics of mission critical data. For example, the archival system 100 can determine the extraction schema 152 based on input received by the enterprise network 14 as to specific users that exchange mission critical data, or other characteristics of the mission critical data. The schema 152 can specify, for archival processing, transaction data by, for example, data type, category (e.g., field identifier, table identifier, row or column, etc.), origin or receiver identifier (e.g., terminal or end user), or other characteristic. In examples, the data sets that are targeted for archival can correspond to, for example, mission critical data and information of the enterprise network 14 or entity associated with a respective account of the TPNS 10. The schema 152 can be specified, or otherwise created by parametric information or input of an administrator of the enterprise. The archival system 100 can use the schema 152 to implement one or more processes to archive targeted transaction data, separate from the larger collections of data that is maintained by the TPNS 10, or exchanged between the client terminals 20 and the TPNS 10.

In some examples, the schema 152 can configure the archival system 100 to target data of a predetermined characteristic, or set of characteristics. For example, the archival system 100 can be programmed to target data of a particular type or category. In examples in which the transactions include field data, the schema 152 can specify that the archival system 100 is to target data associated with a specific field or set of fields. In such examples, a given client terminal 20 can exchange a data set for a particular form or pre-structured data set, and the target data can be specific to data for a particular field or set of fields of a given form (or table) which includes a larger collection of fields.

As an addition or variation, the schema 152 can specify other parameters by which the archival system 100 is to select transaction data sets for archival. In some examples, the schema 152 can configure the archival system 100 to select transaction data, or transaction data of a particular type or characteristic, where the data originates from and/or is intended for a particular client terminal or user. Still further, in other variations, the schema 152 can specify selection of transaction data of a particular type or characteristic.

In some examples, the archival system 100 uses the schema 152 to configure a set of data filters 154 to identify targeted data sets that are received by the client interface 112 and/or the service interface 122 for archival purposes. The data filters 154 can be used to identify targeted transaction data that is received by the client interface 112 (e.g., client requests 111) and/or the service interface 122 (e.g., response communications 121). In this way, the data filters 154 can be configured to identify transaction data by, for example, data type, category (e.g., by field identifier), origin/receiver (e.g., user or terminal) or other characteristic. In examples, the data filters 154 can be used to filter the transaction data down to essential or mission critical data, with data representing formatting, user-interface features or other non-essential data layers being excluded from the extraction. The relative high-specificity of the data filters 154 can be used can enhance the overall efficiency and responsiveness of the archival system 100, as well as that of a disaster recovery system 172 (as described below).

In examples, the archival system 100 includes an extraction component 156 to replicate targeted data sets that are identified by the filters 154 for archival purposes. The extraction component 156 can operate in conjunction with the data filters 154, to seamlessly enable replication of targeted data for archival purposes, while underlying data transactions continue to be processed by the archival system 100 for use with intercept sub-system 110.

In examples, the extraction component 156 can process each of the client requests 111 and the response communications 121 to generate an archive representation 175 of an account data set 25, where the account data set 25 corresponds to, for example, a record (or multiple records), table, or file that is resident on the TPNS 10. The extraction component 156 can generate the archive representation 175 over the course of a client session, using data communicated by the respective client request 111 and response communication 121. The extraction component 156 can generate the archive representation 175 by, for example, parsing or tokenizing payload data of the client requests 111 and response communications 121, using the schema 152 to select, for archival, data sets which correspond to the account data set 25. In this way, the extraction component 156 can generate the archive representation 175 without, for example, querying the TPNS 10. Moreover, the archive representation 175 can be structured to eliminate non-essential data layers, such as presentation or formatting data.

Accordingly, to generate archive representation 175, the extraction component 156 can implement operations to parse or tokenize the content data exchanged in the transactions between the client 20 and the TPNS 10 which pertain to the specific targeted account data set 25, in order to identify those data items that are preselected for archival by the schema 152. The extraction component 156 can further implement operations to replicate the selected data items, as identified by the schema 152, in order to generate the archive representation 175.

According to examples, the archive representation 175 can include change data 157 extracted from the client request 111. The change data can reflect one of (i) a change to an underlying data item, as specified by a respective client communication 111; and/or (ii) a changed data item. For example, during a given client session, the extraction component 156 can parse or tokenize the respective client requests 111 to identify changes which the respective client terminal 20 is making to a data item of the targeted account data set 25. The extraction component 156 can identify the change data 157 as, for example, the data item that is subject to change by the respective client request 111 in at least one of a changed or unchanged state, along with a transaction record that specifies the change that is being made to the underlying data item by the respective client request 111. The extraction component 156 can further replicate the data item in each of the changed state (reflecting change from the respective client request 111) or unchanged state (before change from the respective client request 111).

In examples, the change data 157 can identify a field, cell, table, file, record or other data item of the account data set 25. Other portions of the archive representation 175 can provide context for the change data 157. Additionally, in examples, the extraction component 156 can process the filtered data to identify change data 157 and contextual data 159. The contextual data 159 can identify information about corresponding change data 157, including (i) information about the origin or target (e.g., receiver) of the change data 157 (e.g., user-related data), (ii) information that identifies a logical structure or relationship of the change data 157 with respect to a structure of the respective account's data collection, and/or with respect to other data items of the respective account's data collection (e.g., identify table or specific form for field data), and/or (iii) information that identifies a logical location of the respective content data with respect to the structure of the accounts' data collection and/or with respect to the domain and network schema of the TPNS 10 (e.g., a page or URL where field data or other data items of the change data 157 are located).

In some variations, the extraction component 156 can also identify metadata to store in association with corresponding change data 157. The metadata can supplement or augment the contextual information. For example, the metadata can identify the time or date when a transaction took place from which the change data 157 was retrieved, as well as a time when a given field value was modified.

In some variations, the contextual data 159 can be determined, or augmented by querying the TPNS 10 for relevant information. For example, the extraction component 156 can query the TPNS 10 for the URL that identifies where the filtered or targeted transaction data resides.

In examples, the archival system 100 can implement a data build process 158 to populate an archival data store 160 that holds an archive of select transaction data, as exchanged between select client terminals 20 and the TPNS 10. The archival data store 160 can be in the form of a database that stores the archive representation 175. In an aspect, the archival data store 160 can be implemented as part of a disaster recovery system 172, to store mission critical data of an enterprise and/or end user in connection with their respective use of the TPNS 10. The disaster recovery system 172 can include an interface 174 to enable an operator (e.g., of the TPNS 10) or end user to enable raw data or query access to data stored within the archival data store 160.

In another aspect, the archival data store 160 can be used to record changes to monitored data items, for purpose of, for example, compliance monitoring. In such examples, the archive representation 175 can include change data 157 identified from a client request 111, where the change data 157 reflects (i) a pre-change data item and a record of a corresponding change that was made to data item by the client terminal, and/or (ii) a post-change data item. In such examples, the client from which the client request 111 is generated, the particular data item or type that is being changed, as well as pre-associated data items to the changed data item, can be specified by the schema 152.

Additionally, the archival data store 160 can be used to store the archive representation 175, along with the change data 157 (e.g., pre-change data item and record of change sought by client request 111), for use with a compliance monitoring service or interface. For example, a compliance monitoring interface or service can enable an enterprise user to access the archive representation 175 from one or more client sessions, in order to enable a viewer to track changes to an underlying data item (e.g., record, table, file, etc.) that is detected as being changed by a respective client request 111.

According to some examples, the archival system 100 can include additional functionality to, for example, modify data sets which are archived for a given account. In examples, the archival system 100 can implement, for example, encryption to encrypt change data 157 before the data is stored within the archival data store 160. In other examples, the archival system 100 can include other functionality, such as to compress or otherwise restructure the data that is stored with the archival data store 160.

By way of examples, the client terminals 20 of an organization can utilize TPNS 10 to store various types of information, including mission critical information related to, for example, customers, interactions with customers, financial information, medical and healthcare related data, stock and inventory data, team communications, project tracking etc. Some of the client terminals 20 can utilize a proxy service to, for example, access the TPNS 10 as external users. An administrator of the enterprise network can configure the schema 152 to specify users, terminals, data types, data fields or other characteristics that are likely to relate to or correspond to mission critical data for the enterprise. For example, the schema 152 can identify field data that relates to customers of the enterprise, as well as data types such as attachments. In examples, the schema 152 can be specified to sufficient detail to limit the amount of data that is archived by the archival system 100 to data that is, for example, of a type or category that is likely needed to maintain a high priority activity of the account holder. In examples, the archival system 100 implements one or more proxy services in connection with enabling or facilitating end users to access the TPNS 10. The archival system 100 can process the data transactions to identify the relevant user, as well as contextual information such as data that identifies a logical location or structure of the data item as stored on the TPNS 10. In examples, the archival system 100 can extract data that is obtained from filtering data transactions of an integrated intercept service, such as implemented by the intercept sub-system 110 of archival system 100.

Intercept Computer System

Figure 2:
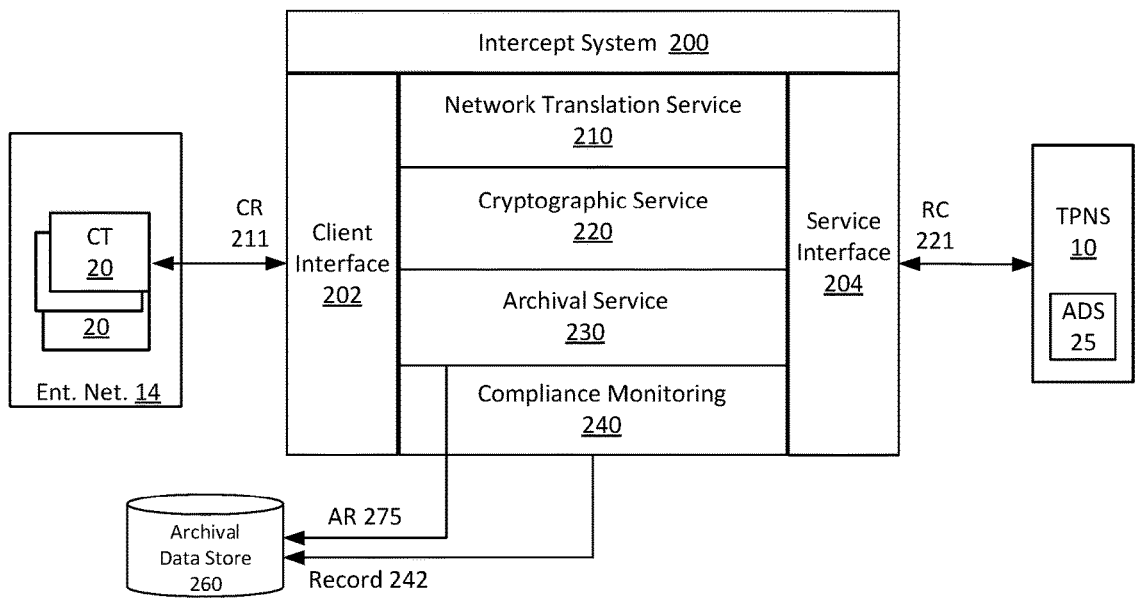
FIG. 2 illustrates an intercept computer system on which an archival service is implemented.

FIG. 2 illustrates an intercept computer system on which an archival service is implemented. In more detail, an intercept computer system 200 can be implemented using a server, or combination of servers, to receive and forward communications between the group of client terminals 20 and the third-party network service 10 ("TPNS 10"). The client terminals 20 can correspond to, for example, an end user terminal, server or other computer system capable of communicating with the intercept system 200 over the World Wide Web and/or other data networks.

The intercept system 200 includes one or more services that process transactions and other communications between client terminals 20 and the intercept system 200. As illustrated by an example of FIG. 2, the intercept system 200 implements an archival service 230, in connection with one or more additional proxy or intercept services. In an example of FIG. 2, the proxy or intercept network services include a client interface 202 to communicate with a set of client terminals, a service interface 204 to communicate with the TPNS 10, as well as a network address translation service 210 and/or a cryptographic service 220. In other variations, other types of proxy or intermediate network services can be employed with the intercept system 200, such as, for example, a traffic monitoring service, a policy enforcement service, and/or a content configuration service.

In examples, the translation service 210 can perform network address translation processes for converting (i) client requests 211 into a target structure of the TPNS 10, and/or (ii) response communications 221 from the target structure into a client structure. The client structure can enable, for example, browsers on the client terminal 20 to access domains and sub-domains of the TPNS 10 using a single certificate. In this way, the translation service 210 can be implemented to enable the client terminals 20 to utilize browsers to have full access to the respective account's data collection, as hosted by the TPNS 10 (e.g., including domains and sub-domains), while alleviating burdensome certificate requisites that may otherwise be required from the TPNS 10.

According to examples, the translation service 210 can implement a request translation process to convert client communications that are intended for the TPNS 10 into a target structure or format of the TPNS 10. The translation service 210 can receive (via the client interface 202) client requests 211 that specify URLs in a packed structure, where the packed structure includes alternative syntax (e.g., "-" or hyphen) to identify sub-domains. The translation service 210 can parse URLs of individual client request 211 to identify the alternative syntax markers of the sub-domains, and to remove corresponding domain components from the URLs. The translation service 210 can also translate the syntax of the respective URLs to include a suffix proxy format. In examples, the translation service 210 translates the URLs from the packed structure into an unpacked or native structure, where the alternative syntax of the packed URLs is replaced with target syntax (e.g., "." or dot) that is recognized by the TPNS 10 to designate, for example, subdomains of the TPNS 10.

The translation service 210 can also perform response translations with respect to TPNS response communications 221 that are received via the service interface 204, and which are intended for specific client terminals 20. The translation service 210 can parse an unpacked (or natively structured) URL component of the response communication 221. The translation service 210 can also translate the unpacked URL into a packed structure, where, for example, alternative syntax (e.g., "-" or hyphen) is used to designate a subdomain portion of the URL.

In examples, the translation service 210 can further access and use any one of a collection of SSL certificates, generated by or for use with the TPNS 10. As described by other examples, the TPNS 10 can utilize subdomains which separately require a specific SSL certificate from the requesting entity (e.g., browser component). The translation service 210 can forward client requests 211 in the native structure of the TPNS 10, while interacting with the TPNS 10 to provide SSL certificates for specified sub-domains of the TPNS 10. The translation service 210 can store and utilize the required SSL certificates for receiving all, or substantially all of the data sets in a given response from TPNS 10. By translating URL structures between client terminals 20 and the TPNS 10, the translation service 210 can, for example, enable a single SSL certificate or wildcard SSL certificate to be employed for individual client terminals 20, without requiring, for example, endpoint configuration by the client terminals 20.

In examples, the cryptographic service 220 performs selective encryption and decryption on data elements that are exchanged between the client terminals 20 and the TPNS 10. In an example, the cryptographic service 220 can receive content (e.g., via TPNS response communication 221) intended for a requesting client computer from the TPNS 10. The content may include a sensitive portion, such as a protected (e.g., encrypted) set of data elements. In some examples, the cryptographic service 220 scans content returned by the TPNS 10 for data elements or portions which were previously encrypted by the intercept system 200, when such content was sent by a corresponding client terminal 20 to the intercept system 200 for forwarding to the TPNS 10.

In examples, the cryptographic service 220 makes a determination as to whether a protected portion of content provided by the TPNS 10 is to be decrypted for a requesting client terminal 20. The cryptographic service 220 may also ascertain the activity or usage of the requesting client terminal 20 for purpose of making the determination. The cryptographic service 220 can send the content returned by the TPNS 10 to the requesting computer in a structure or form that is based on the determination. For example, the determination may be based at least in part on determining whether a risk metric associated with the user's current or past activity exceeds a predetermined threshold. If the risk metric indicates a risk level that exceeds the predetermined threshold level, the cryptographic service 220 can send the content returned by the TPNS 10 in encrypted form, or alternatively, in masked form (e.g., content is removed or replaced by other non-sensitive content). If, on the other hand, the risk metric indicates a risk level that is less than the predetermined threshold level, the cryptographic service 220 may decrypt the content returned by the TPNS 10, and then send the decrypted content returned by the TPNS 10 to the requesting client terminal 20.

The cryptographic service 220 can perform cryptographic operations on data elements communicated between client computers 20 and one or more third-party network services 10. The cryptographic operations can include encryption and decryption operations, as well as compatibility operations. The cryptographic service 220 can associate cryptographic logic with specific data elements (e.g., select data fields) that are to be encrypted. In some examples, the cryptographic service 220 implements encryption on data elements that are subsequently communicated to and stored with the TPNS 10. The cryptographic service 220 can also store or otherwise maintain data to decrypt data elements of, for example, the TPNS response communications 221.

In variations, the cryptographic service 220 can receive requests from a programmatic entity, where each request can specify one or more data elements which were previously encrypted by the cryptographic service 220. The programmatic entity can correspond to, for example, a workflow, a program, a routine or a process implemented by the TPNS 10, or by another third-party service. The cryptographic service 220 can provide a response to the request to enable the programmatic entity to use the data element in a decrypted form. In one implementation, the cryptographic service 220 decrypts data elements specified by the request, and then sends the data elements in the decrypted form to the requesting entity. In a variation, the cryptographic service 220 receives the request from a first entity (e.g., ERP service), and retrieves the data in encrypted form from a second entity (e.g., TPNS 10). The intercept system 200 can decrypt the retrieved data, and sends the data elements in decrypted form to the first entity.

In some examples, the cryptographic service 220 also includes interoperability parameters, including parameters that specify a format, configuration, or setting for use of the data elements in the decrypted form. In variations, the interoperability parameters can specify a workflow, or sequence of operations, for example, to ensure proper use of the data elements in the decrypted form.

The archival service 230 can be implemented using, for example, the archival system 100 of examples of FIG. 1. Accordingly, the archival service 230 can implement data filters 154 (as shown in FIG. 1) to identify target data sets for archival. The archival service 230 can, for example, implement data filters 154 with the client interface 202 and/or service interface 204, to filter respective client requests 211 and/or response communications 221, and to extract data for archival. As described by various examples, the archival service 230 can generate an archival data set for storage with an archival data store 260 that is independent of the TPNS 10.

In examples, the archival service 230 can generate and store archival representation 275 within an archival data store 260. As described with other examples, the archival data store 260 can be configured to store an archive representation 275 of select portions of the account data set 25 (e.g., mission critical data for the respective enterprise account), where the archival representation 275 includes data that reflects a change or update the account data set 25, as well as data that reflects a state of select data items that are pre-associated, or otherwise identified, as being relevant to the change or update. For example, the archival data representation 275 can include data that reflect a field (e.g., cell of table) that is changed by a client request 211, as well as data that reflects other fields (e.g., other cells) that are pre-associated or are otherwise contextually relevant to the changed data item. In such examples, the other fields can be identified from, for example, one or more service responses 221 that are made in context of the corresponding client request 211, such as during the client terminal's session, as well as prior or in response to the client request 211 in which the data item is changed. The service response(s) can reflect, for example, a state or value of the other pre-associated data items at the time when the change resulting from the client request 211 is made to the account data set 25 of the TPNS 10.

According to some examples, the archival service 230 can be used in connection with the archival data store 260 being configured to be available to client terminal(s) 20, independent of the TPNS 10. Still further, in some variations, the archival data store 260 can reside within the enterprise network 14, such that client terminals 20 can access the data subject to rules and policies of the enterprise, and independent of the TPNS 10. In variations, the archival data store 260 can be integrated with the intercept system 200, and also independent of the TPNS 10.

Additionally, the archival data representation 275 can be generated from data included with the processed client requests 211 and/or service responses 221. Still further, the archival service 230 can generate the archival data representation 275 exclusively from data extracted from client requests 211 and/or service responses 221, such that the archival data representation 275 is generated without the intercept system 200 having to separately query the TPNS 10 or otherwise access the account data set 25 residing with the TPNS 10.

In examples, the archival data representation 275 can include records generated by the archival service 230 to reflect a state of a target data set 25 (or portion thereof) residing at the TPNS 10, as identified from respective client requests 211 and/or service responses 221. As an addition or variation, the archival data representation 275 can include copies of select data items (or portions thereof) that are the subject of respective client request 211 and/or service responses 221.

As an addition or variation, the archival service 230 can filter data sets that are processed through, for example, one or more of the proxy or intercept network services, such as the network translation service 210 and/or cryptographic service 220. By way of example, the archival service 230 can use filters to identify data elements which are encrypted by the cryptographic service 220. The encrypted data elements can be replicated and stored, in encrypted form, with the archival data store 160 (see FIG. 1) of the archival service 230. Thus, for example, the cryptographic service 220 can encrypt target data that is identified from, for example, client requests 211 (e.g., by user and data type or category), and the archival service 230 can deploy filters with the cryptographic service 220 to separately extract and replicate the encrypted data sets that are generated through the cryptographic service 220.

As another example, the archival service 230 can use filters to identify targeted data sets that are maintained, or otherwise provided by a given subdomain of the TPNS 10. For example, the archival service 230 can employ filters to identify client requests 211 which relate to data items that reside at a given subdomain of the TPNS 10. As the client request 211 may be packed (to include alternative syntax for identifying domains), the archival service 230 can integrate the filters with the processes of the network translation service 210 to identify client requests 211 in their respective unpacked form (to include the native structure of the TPNS 10 for designating subdomains). Thus, for example, the network translation service 210 can process a client request 211 by unpacking the communication (e.g., replacing syntax to identify subdomains), and the archival service 230 can employ the filters to identify change data 157 (see FIG. 1) associated with the client request, based on the subdomain identified by the unpacked client request.

In variations, the intercept system 200 includes a compliance service 240 that tracks a pre-defined set of events, and stores data that reflects the occurrence of the pre-defined event. The compliance service 240 can be implemented by one or more processes of the intercept system 200 that analyze or otherwise process the client requests 211 and/or service responses 221, in order to detect the occurrence of a pre-defined event. The compliance service 240 can, for example, parse or tokenize the client requests 211 and/or service responses 221 to detect one or more events that are defined as part of the schema 152 (see FIG. 1) for the corresponding account.

In examples such as described below, the compliance service 240 is integrated with the archival service 230, such that, for example, the compliance service 240 and the archival service 230 share common processes, with the compliance service 240 using the archival data store 260. In variations, the compliance service 240 can be implemented separate or independent of the archival service 230, with, for example, the compliance service 240 using separate processes and/or data stores as those of the archival service 230.

In some examples, the predefined events that are monitored and/or detected by the compliance service 240 can relate to an underlying data item that is stored with the TPNS 10. By way of example, the predefined events can relate to a select client terminal 20 accessing, adding, deleting and/or modifying a data item (e.g., file, record), or portion thereof (e.g., specific field) that is maintained by the TPNS 10 as part of the corresponding account's set 25.

According to examples, the compliance service 240 generates one or more records that include data reflecting the occurrence of the predefined event. For example, if a given user or client terminal modifies a data item of the account's data collection, the compliance service 240 can detect the event and generate a corresponding record that identifies (i) the user or client terminal that made the change; (ii) the action that was performed to generate the event; (iii) change data 157 (see FIG. 1)) reflecting, for example, a changed data item; (iv) a state or value of one or more data items that pre-associated with the changed data item; (v) contextual information 159 that identifies a logical structure of a portion of the data collection where the changed data item resides, and/or a logical location of the changed data item; and/or (vi) metadata pertaining to the event, such as a time stamp of the event.

In some variations, the compliance service 240 can also store one or more of the underlying data item that was changed, or otherwise subject to the predefined event, in at least one of a changed state (e.g., as modified by a processed client request 211) or unchanged state (e.g., before modification by the processed client request 211). The underlying data item can also be linked or otherwise associated, in the archival data store 260, with the record that reflects the change made to the underlying data item. Still further, the compliance service 240 can store the records that reflect respective changes to underlying data items, in association with an archived data set that includes the underlying data items, as stored in the archival data store 260. For example, the compliance service 240 can generate a record 242 that reflect a changed data item, and further store the record in the archival data store 260, in association with a corresponding archival representation 275 that includes the changed data item. In such examples, the compliance service 240 can generate the record by parsing or tokenizing data exchanged between the client(s) and the TPNS 10. Thus, the compliance service 240 can generate records 242, as well as any associated or linked data items without accessing TPNS 10.

Methodology

Figure 3:
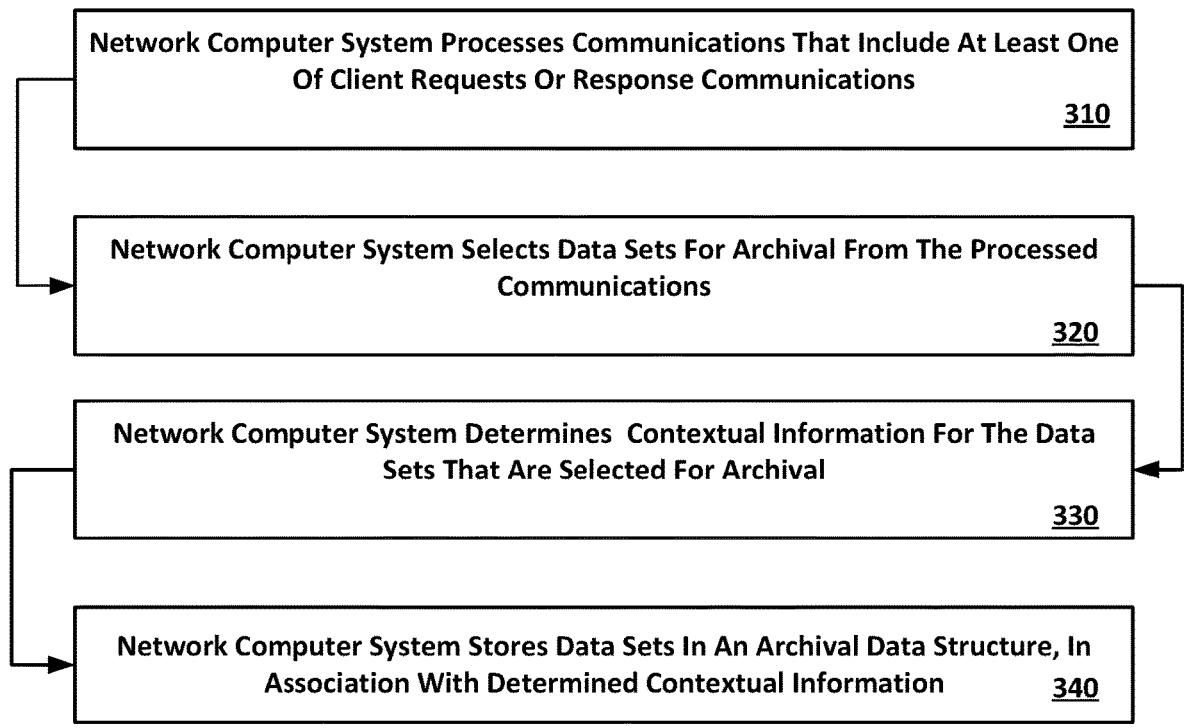
FIG. 3 illustrates an example method for implementing an archival service for use with a third-party network service.

FIG. 3 illustrates an example method for operating a network computer system to implement an archival service for use with a third-party network service. A method such as described with an example of FIG. 3 can be implemented using, for example, a network computer system, such as described with examples of FIG. 1 or FIG. 2. Accordingly, reference may be made to elements of FIG. 1 or FIG. 2 for purpose of implementing a step or sub-step being described.

With reference to an example of FIG. 3, a network computer system can be implemented to process communications that include at least one of client requests 111 sent from client terminals 20 to TPNS 10, or response communications 121, sent from the TPNS 10 to the set of client terminals 20 (310). For example, archival system 100 can process transactions exchanged between client terminals 20 of an enterprise network and the TPNS 10. For example, a network computer system can be operated to implement the archival system 100 along with an intermediate or intercept system. Still further, as described with an example of FIG. 2, the network computer system can be implemented to provide one or more intercept or proxy services (e.g., translation service 210 or the cryptographic service 220) that integrate archival service 230. In other variations, a network computer system can implement the archival system 100 as a stand-alone service that can be directly utilized by, for example, the client terminals 20 or the TPNS 10.

In examples, a network computer system can be operated to select data sets from the processed communications for archival (320). For example, a network computer system can implement the archival system 100 to receive and extract select data sets from individual client requests 111 and/or service response communications 121. In examples, a collection of client requests can be received in a given time interval, and the archival system 100 can select a portion of the client requests 111 for archival. Additionally, the collection of client requests 111 can generate a corresponding collection of service response communications 121 from the TPNS 10. In examples, the archival system 100 can be implemented to select a portion of the response communications 121 from the greater collection, for purpose of archival. In examples, the network computer system can also implement the archival system 100 to select client requests 111 that originate from one or more pre-selected client terminals and/or users, and/or response communications 121 that are targeted to one or more pre-selected client terminals and/or users.

Still further, the network computer system can implement the archival system 100 to select, for archival, data sets that comprise a portion of a larger amount of data that is exchanged by client requests 111 and response communications 121. In examples, the archival system 100 can be implemented to parse the individual client request 111 and/or response communication 121 to identify data sets of a particular type, or category (e.g., data sets that share a predetermined characteristic). For example, the archival system 100 can be implemented to parse individual client requests 111 and response communications 121 to identify data sets that correspond to, for example, a select data item such as a file, record, field, etc. In such examples, the TPNS 10 can structure the data collection of an account associated with the client terminals 20 to include specific fields, and the archival system 100 can parse the individual client requests 111 and response communications 121 to identify select fields for archival.

In examples, the archival system 100 can be implemented to utilize an account-specific schema 152 that identifies, for a given account, specific client terminals or end users, as well as data types, categories and/or other characteristics (e.g., specific field data) for archival. In this way, the archival system 100 can be implemented to target specific data items (e.g., files, records), such as data items that are pre-identified as mission critical data for the given user account.

The network computer system can also implement the archival system 100 to determine pre-associated information for the data sets that are selected for archival (330). The pre-associated information can include data items specified by, for example, a corresponding schema 152 as being relevant to data items that are changed by the client requests 111. Additionally, the network computer system can determine contextual information, such as data that identifies a logical structure or location of the data selected for archival. By way of example, the contextual information can include (i) an identifier of a user or terminal that originated a corresponding request 111 or received a corresponding response communication 121, (ii) a URL that identifies a data structure (e.g., web page) where selected data item(s) located, (iii) a field name, (iv) a table identifier, and/or (v) a column or row where selected date item(s) are located.

The archival system 100 can further be implemented to store the archival data sets, including the changed data 157, as well as other data, such as the pre-associated information (e.g., as identified by the archival representation 175), the determined contextual information, and/or identified metadata of the data exchanged. The archival system 100 can store the archival information in an archival data structure that is independent of the TPNS 10 (340). For example, an archival database can be maintained for a given enterprise account. In the event that a disaster recovery is needed, the client terminals 20, or an admin terminal thereof, can access the archive database for recovery of data sets that are mission critical to the enterprise entity.

Hardware Diagram

Figure 4:
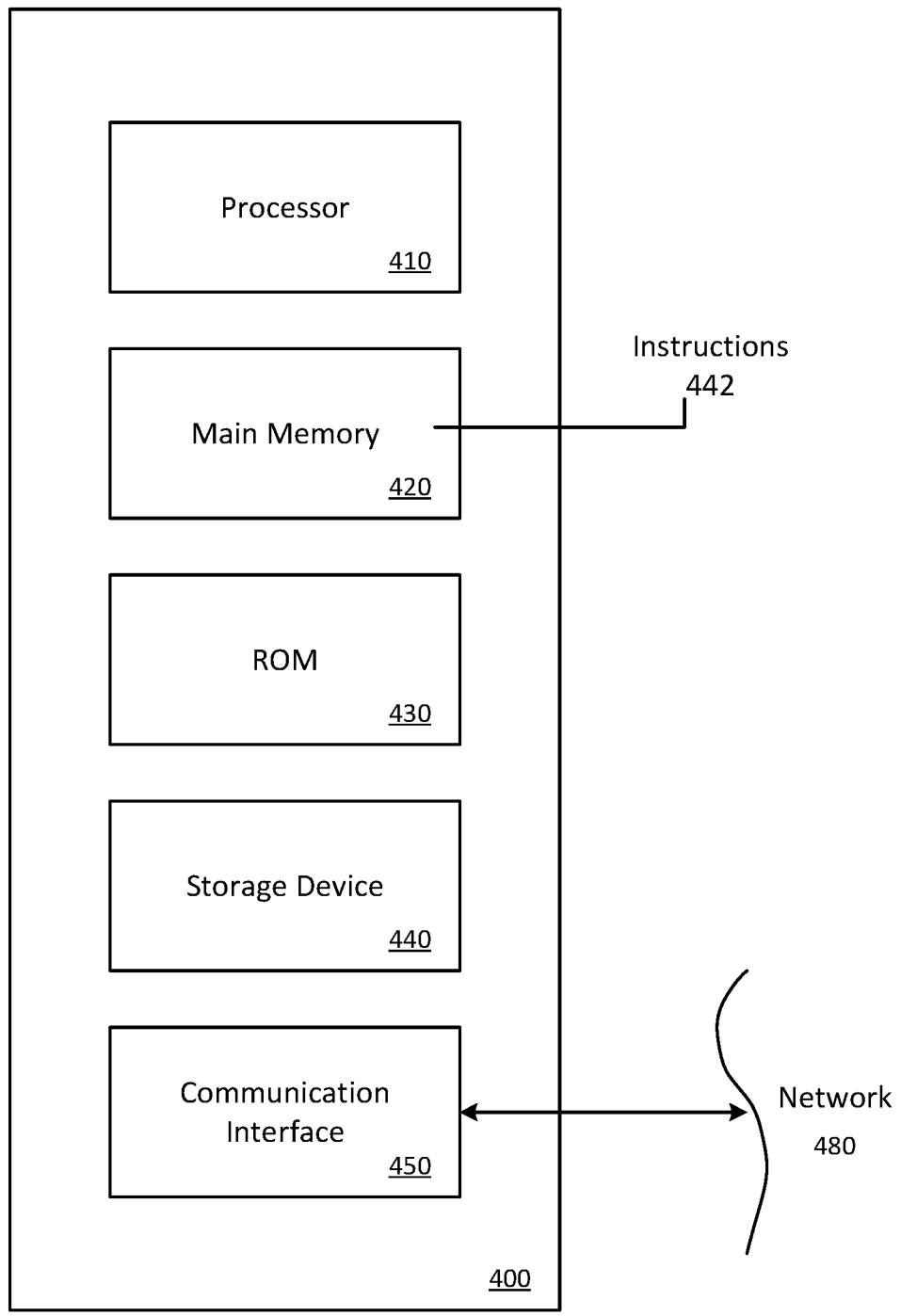
FIG. 4 is a block diagram that illustrates a computer system upon which embodiments described herein may be implemented.

FIG. 4 is a block diagram that illustrates a computer system upon which embodiments described herein may be implemented. For example, in the context of FIG. 1, the archival system 100 may be implemented using a computer system such as described by FIG. 4. Likewise, in the context of FIG. 2, the intercept system 200 can be implemented using a computer system such as described with an example of FIG. 4. Additionally, a method such as described with an example of FIG. 3 can be implemented using a computer system such as described with an example of FIG. 4. Still further, examples of FIG. 1, FIG. 2 and/or FIG. 3 can be implemented using a combination of multiple computer systems as described by FIG. 4.

In one implementation, a computer system 400 includes processor(s) 410, a main memory 420, a read only memory (ROM) 430, a storage device 440, and a communication interface 450. The computer system 400 includes the at least one processor 410 for processing information and executing instructions stored in the main memory 420. The main memory 420 can correspond to, for example, a random access memory (RAM) or other dynamic storage device, for storing information and instructions to be executed by the processor 410. The main memory 420 can also be used for storing temporary variables or other intermediate information during execution of instructions to be executed by the processor 410. The computer system 400 may also include the ROM 430 and/or other static storage device for storing static information and instructions for the processor 410. A storage device 440, such as a magnetic disk, solid state drive or optical disk, can be provided to store data sets, such as provided by the archival data store 160. The main memory 420 can store instructions 442 for implementing an archival system or service, such as described with examples of FIG. 1 or FIG. 2. Additionally, the processor 410 can execute the instructions 442 to implement a method such as described with an example of FIG. 3.

The communication interface 450 can enable the computer system 400 to communicate with one or more networks 480 (e.g., cellular network) through use of the network link (wireless or wireline). Using the network link, the computer system 400 can communicate with, for example, client terminals 20, servers and one or more third-party network services 10.

Examples described herein are related to the use of the computer system 400 for implementing the techniques described herein. According to one embodiment, those techniques are performed by the computer system 400 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

CONCLUSION

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations

What is claimed is:

1. A computer system comprising:
 a memory to store a set of instructions;
 one or more processors, wherein the one or more processors execute the set of instructions to:
  determine a data extraction schema for a data set maintained by a third-party network service, the data extraction schema comprising a set of data filters for identifying critical data to monitor;
  obtain communications sent in a web session between a client terminal and the third-party network service to monitor the client terminal's access of the data set in the web session;
  process the communications between the client terminal and the third-party network service in accordance with the data extraction schema to identify transaction data affecting the critical data to monitor;
  update one or more records corresponding to affected critical data in an archival data structure for the critical data that is independent of the third-party network service based on the transaction data identified in the communications between the client terminal and the third-party network service; and
  in response to receiving a client request to access the archival data structure, provide access to the archival data structure without accessing the third-party network service.

2. The computer system of claim 1, wherein obtaining the communications includes implementing a proxy service that intercepts client communications from the client terminal to the third-party network service, forwards the client communications to the third-party network service, receives response communications from the third-party network service, and forwards the response communications to corresponding client terminals.

3. The computer system of claim 1, wherein the data extraction schema is based at least in part on a critical data type for compliance.

4. The computer system of claim 1, wherein the data extraction schema is based at least in part on an account or end-user identifier associated with at least one of a request or a response communication.

5. The computer system of claim 1, wherein the one or more processors identify, for archival, (i) a changed data item by a corresponding client request, and (ii) one or more data items that are pre-associated with the changed data item.

6. The computer system of claim 5, wherein the one or more processors identify the one or more pre-associated data items from one or more service response communications that are exchanged in context of the corresponding client request.

7. The computer system of claim 6, wherein the one or more processors generate an archival representation that includes the changed data item and the one or more pre-associated data items, using each of the corresponding client request and one or more service response communications that are exchanged in context of the corresponding client request.

8. The computer system of claim 7, wherein the one or more processors store the archival representation with the archival data structure, without obtaining the one or more pre-associated data items from the third-party network service.

9. The computer system of claim 1, wherein the computer system is positioned to intercept client requests from a plurality of client terminals that are intended for the third-party network service, and response communications from the third-party network service that are intended for any of the plurality of client terminals.

10. The computer system of claim 1, wherein the one or more processors process the communications to implement a proxy service for a set of client terminals comprising the client terminal.

11. The computer system of claim 1, wherein the one or more processors process the communications to implement at least a network address translation service in connection with individual client terminals in a set of client terminals utilizing browsers to access the third-party network service.

12. The computer system of claim 1, wherein the one or more processors process the communications to implement a cryptographic service that selectively encrypts a portion of individual requests sent from one or more client terminals.

13. The computer system of claim 12, wherein the one or more processors implement the cryptographic service to decrypt encrypted data elements of corresponding response communications to the individual requests.

14. The computer system of claim 12, wherein for at least some of the individual requests that are sent from one or more client terminals, the one or more processors implement the cryptographic service to encrypt one or more data elements that comprise only a portion of the individual requests; and wherein the one or more processors extract the one or more encrypted data elements from the processed communications by selecting the encrypted data elements, apart from a remainder of the individual requests, for archival.

15. The computer system of claim 14, wherein the one or more processors determine one or more pre-associated data items for the one or more encrypted data elements, and store the one or more pre-associated data items with the one or more encrypted data elements in the archival data structure.

16. The computer system of claim 12, wherein the one or more processors access the set of instructions to store a cryptographic key for decrypting the one or more encrypted data elements from the archival data structure.

17. A non-transitory computer-readable medium that stores instructions, which when executed by one or more processors of a computer system, cause the computer system to perform operations that include:

determine a data extraction schema for a data set maintained by a third-party network service, the data extraction schema comprising a set of data filters for identifying critical data to monitor;

obtaining communications sent in a web session between a client terminal and the third-party network service to monitor the client terminal's access of the data set in the web session;

processing the communications between the client terminal and the third-party network service in accordance with the data extraction schema to identify transaction data affecting the critical data to monitor;

updating one or more records corresponding to affected critical data in an archival data structure for the critical data that is independent of the third-party network service based on the transaction data identified in the communications between the client terminal and the third-party network service; and in response to receiving a client request to access the archival data structure, provide access to the archival data structure over a network without accessing the third-party network service.

18. A method for operating a computer system, the method being implemented by one or more processors of the computer system and comprising:

determine a data extraction schema for a data set maintained by a third-party network service, the data extraction schema comprising a set of data filters for identifying critical data to monitor;

obtaining communications sent in a web session between a client terminal and the third-party network service to monitor the client terminal's access of the data set in the web session;

processing the communications between the client terminal and the third-party network service in accordance with the data extraction schema to identify transaction data affecting the critical data to monitor;

updating one or more records corresponding to affected critical data in an archival data structure for the critical data that is independent of the third-party network service based on the transaction data identified in the communications between the client terminal and the third-party network service; and in response to receiving a client request to access the archival data structure, provide access to the archival data structure over a network without accessing the third-party network service.

19. The computer system of claim 1, wherein updating the one or more records corresponding to affected critical data in an archival data structure the archival data structure comprises storing metadata describing one or more changes to the affected critical data in the archival data structure.

\* \* \* \* \*